United States Patent

[11] 3,614,159

[72] Inventor Georges Christin
 Marnes-La-Coquette, France
[21] Appl. No. 802,601
[22] Filed Feb. 26, 1969
[45] Patented Oct. 19, 1971
[73] Assignee Etablissments Bertrand Faure
 Puteaux, France
[32] Priority Feb. 27, 1968
[33] France
[31] 141452

[54] SEAT CUSHION
 7 Claims, 7 Drawing Figs.
[52] U.S. Cl. .................................... 297/452,
 297/459
[51] Int. Cl. ...................................... A47c 3/00,
 A47c 7/14, B60n 1/06
[50] Field of Search.......................................... 297/418,
 419, 445, 452–459; 5/355, 351

[56] References Cited
 UNITED STATES PATENTS
 3,111,345 11/1963 Peras............................ 297/455
 3,175,863 3/1965 Hood............................ 297/455
 3,208,085 9/1965 Grimshaw .................... 297/452 X
 3,257,149 6/1966 Fruchte et al................. 297/452
 3,487,134 12/1969 Burr............................. 264/45

Primary Examiner—Casmir A. Nunberg
Attorneys—Waters, Roditi, Schwartz and Nissen ABSTRACT: The seat cushion comprises a central slab of cellular material having marginal zones, and two side members of cellular material each having a projecting edge portion with a free extremity, the projecting edge portion of each said side member covering a respective marginal zone of said central slab and said cellular material of said central slab being of greater resiliency than said cellular material of said side members.

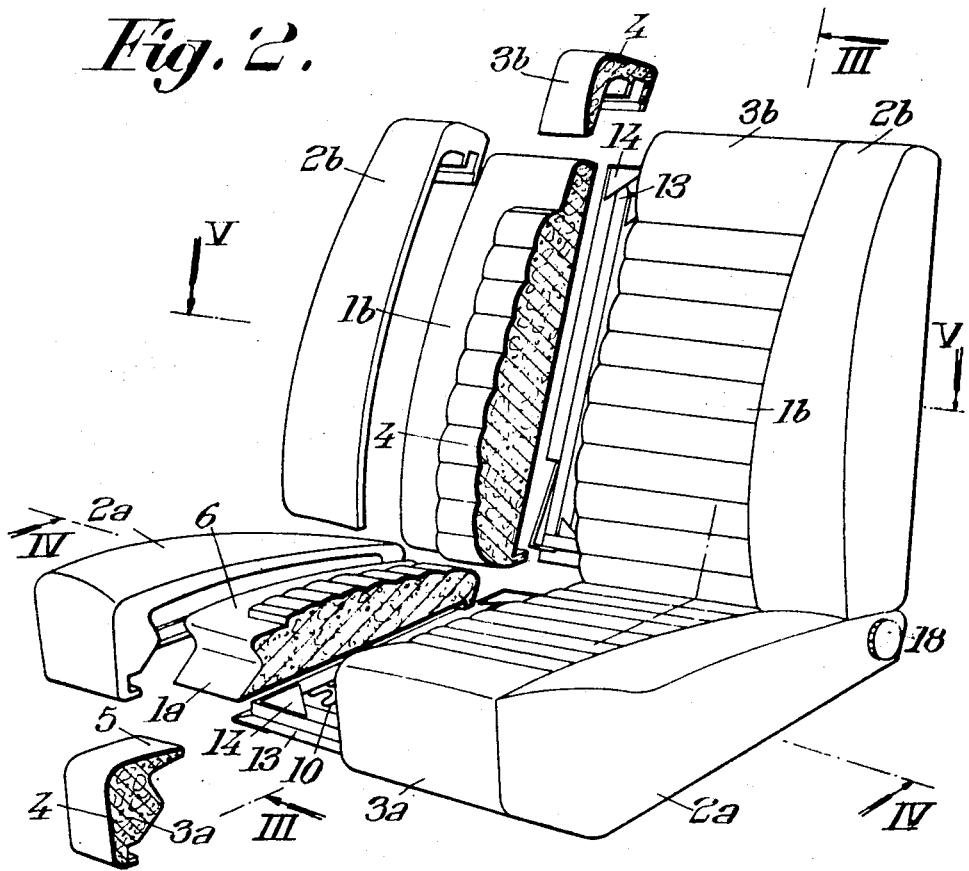
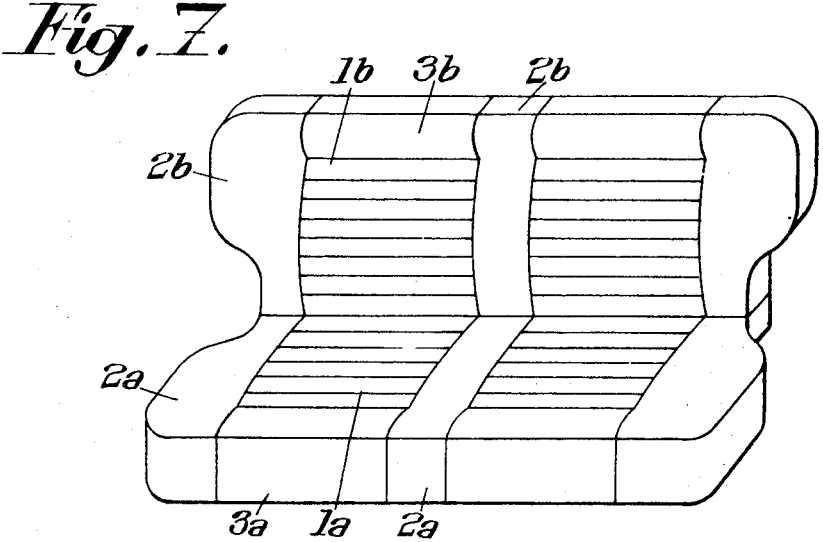

SEAT CUSHION

The invention relates to seat cushions composed of separate juxtaposable blocks made from cellular materials of different resilience, to seats (especially seats for vehicles and in particular for automobile road vehicles) with such cushions, and to processes of manufacturing such cushions and seats.

In conventional seats composed of a comfortable seat portion and back portion, intended in particular for equipping automobile vehicles, each of the two parts of the seat (seat portion and back portion) is constituted by a rigid frame carrying a resilient structure of metallic springs itself covered by a foam cushion. In the most frequent case this foam cushion is formed in a single block, which excludes the possibility of varying locally the resilience of the supporting surface of the cushion in accordance with the respective roles played at the various parts of the surface.

In an advantageous modification it has been proposed to form the said cushion with the aid of separate blocks of foam of different resilience, the blocks comprising a central slab which is relatively resilient and two firmer side members. But in this modification the said blocks were juxtaposed along vertical planes, which presented in particular two disadvantages both of which are due to the differences between the deformabilities of the juxtaposed blocks on one side and the other of these planes. On the one hand the part of the supporting surface disposed perpendicularly to each plane of juxtaposition constitutes a relatively hard line felt to be disagreeable by the seated person and on the other hand, when the cushion is loaded merely by supporting a seated person, the juxtaposed blocks tend to separate from one another by cleavage, causing the appearance between them of gaps the width of which increase with time.

According to the invention there is provided a seat cushion composed of separate blocks made from cellular materials of different resiliences, the blocks comprising a relatively resilient central slab and two firmer side members with each side member including a projecting edge covering a marginal zone of the central slab. The projecting edge of each side member preferably decreases progressively in thickness towards its free extremity and the said marginal zones of the central slab are preferably set back in the central slab.

The cushion preferably also includes an end pad (front pad if it is for a seat portion, upper pad if it is for a back portion) made from a cellular material more resilient than the central slab, this pad including a projecting edge of the type defined above for the side members.

It is further preferred that each of the different blocks constituting the cushion should be formed by moulding with a finishing skin extending over at least all that part of its external surface exposed at the exterior of the completed cushion. The adjacent and juxtaposable faces of the various blocks preferably have complementary shapes receivable one within the other, and, in seats or seat portions comprising a rigid supporting frame and a cushion such as defined above, the frame preferably directly supports the periphery of the central slab of the cushion.

The projecting edges provided on the side members of the seat in accordance with the invention remedy the various drawbacks of the above-mentioned prior constructions; the resilience of the supporting surface, being the resultant of the resiliences of the superposed blocks parts of blocks) that it covers, varies progressively along this surface from the relatively firm sides to the relatively resilient center of the cushion, especially if the thickness of the projecting edges varies progressively. Further, the lateral coverage effected by each edge practically excludes the risk of separation by cleavage.

Embodiments of the invention will now be described, by way of example only, with reference to the accompanying drawings, in which:

FIGS. 2, 3, 4 and 5 show in more detail such a seat in accordance with the invention, being respectively a perspective view with parts removed, vertical sections on the lines III—III and IV—IV of FIG. 2 and a horizontal section on the line V—V of FIG. 2.

FIG. 7 shows in perspective view a bench seat for two places made in accordance with the invention. In the practical form of the seat cushion illustrated in the drawings, the independent blocks of foam comprise:

Figure 1:
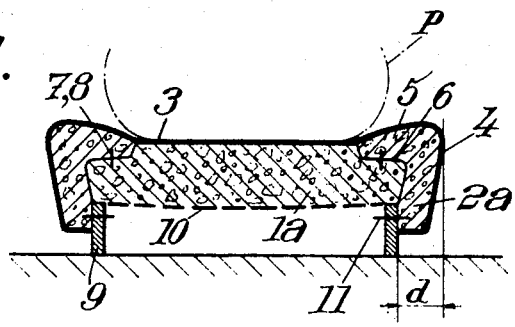
FIG. 1 shows diagrammatically, in vertical cross section, a seat portion of a seat for one place made in accordance with the invention.

a central slab ($1a$ or $1b$, the index $a$ being used for the elements constituting the seat portion and the index $b$ for the elements constituting the back portion) formed from a relatively resilient foam and intended to support the greater part of the weight of the seated person P;

two firmer sides ($2a$ or $2b$) adjoining this slab laterally and having the main object of keeping the seated person in place and preventing swaying movements when the vehicle turns, and preferably also a pad ($3a$ or $3b$) more resilient than the central slab and constituting the free end of the cushion (front end for the seat portion, upper end for the back portion), the function of this pad being to support resiliently either the thighs or the nape of the neck of the seated person, the upper pad $3b$ also constituting a safety padding for the rear passengers when it equips a back portion of a front seat of the vehicle.

The blocks are covered, preferably individually, with a finishing skin 4.

The said skin is advantageously made by moulding with the corresponding blocks in a manner known in itself. For this purpose it is sufficient in accordance with the technique known as "integral foam," to inject cold into a shaped mould (advantageously pitted with the negative impression of the outer surfaces of an actual skin and its seams) a polyol and an isocyanate in such manner as to form a polyurethane foam by the reaction between these two substances.

However, this skin 4 may also be applied to the working face of each foam block by any suitable process after the moulding of this block, which is relatively easy since the said face does not in general have any reentrant zone.

As can be seen from the Figures, it is preferred that the juxtaposed faces of the various blocks should have complementary profiles such that they may fit exactly one into the other.

An advantageous profile is that described by a straight line moving parallel to itself along a zigzag line with rounded angles including at least one Z.

A projecting edge 5 is included in each of the peripheral blocks, which edge in its final position covers a marginal zone 6, preferably slightly set back, of the central slab.

The thickness of this edge preferably decreases up to its free extremity and its width is preferably greater than 5 cm, that is to say at least equal to half the total width of the block of which it forms a part.

The assembly of the blocks against one another is effected in any desired manner, in particular by sticking, or with the aid of spring clips 7 fixed in one of the blocks and cooperating with rigid seatings 8 fixed in the adjacent block.

The assembly of the two lateral blocks ($2a$ or $2b$ of a cushion could be constituted by a single block of U-shaped or be in the form of a frame surrounding the central slab and furnished individually with its finishing skin.

The assembly of blocks forming each cushion is mounted in any desired manner on a rigid frame 9 and its resilient structure comprising springs 10, for example with the aid of other clips 11 fixed in some of the said blocks.

Each of the cushions thus obtained by juxtaposition of separate blocks in the manner of a puzzle presents numerous advantages, in particular as regards the simplicity and economy of its manufacture, the comfortable support that it ensures, longevity and quality of appearance.

With regard to this last point, it is to be noted in particular that the principal reentrant lines 12 of the external surface of the cushion may be located naturally at the junction zones between the various adjacent blocks; one can therefore avoid emphasizing these lines by piping, as is often necessary in conventional cushions.

The supporting frame 9 preferably has external dimensions—in particular a width—appreciably smaller than the corresponding dimensions of the said cushion.

Such an arrangement is made possible by the choice, explained above, of a relatively firm foam for making the sides of the cushion that project over the said frame, such that these sides are not liable to give way although arranged so as to overhang slightly.

It has the considerable advantage that one is able to use one and the same standard frame for making a large number of cushions of different appearance and/or dimensions by simple modification of the shapes and dimensions of at least some of the peripheral foam blocks forming the cushion supported by this frame; in particular there may be used two absolutely identical frames for making the seat portions (or the back portions) of the two left and right front seats of an automobile vehicle, having for example symmetrical shapes relative to the vertical longitudinal medial frame of the vehicle.

It is such an arrangement that has been illustrated in the drawings.

The frame 9 substantially matches the periphery of the central slab 1a or 1b, the said periphery resting directly on this frame. The remainder of the slab is supported by the structure having springs 10. As regards the sides (2a, or 2b) and the pads (3a, 3b), they project at least partly over the exterior of the frame, for a distance d between 3 and 5 cm. In this case, if we consider the cross section of a side or pad, the point of the said side disposed highest and most externally of the cushion is advantageously spaced by more than 10 cm. from the frame, which leaves a good thickness of foam between the rigid frame and the supporting surface.

Figure 5:
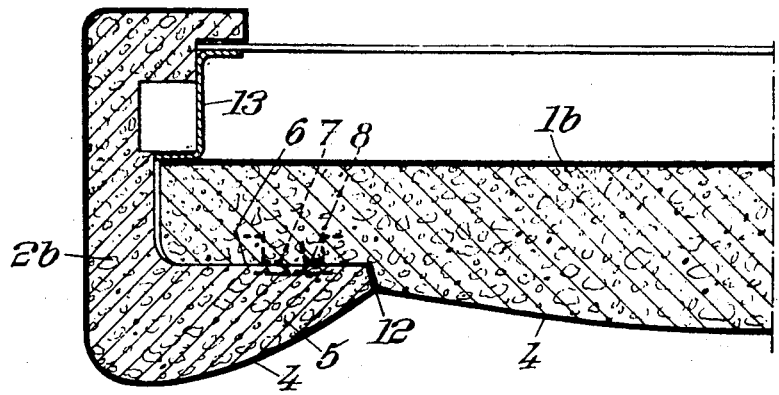
Figure 4:
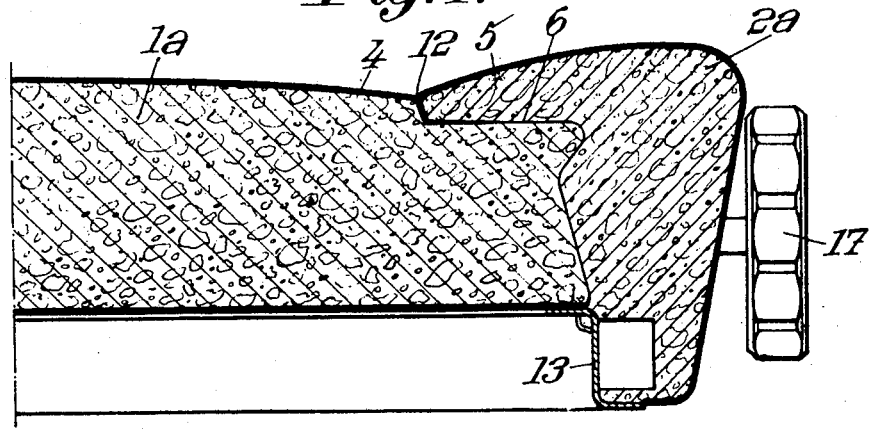
Figure 3:
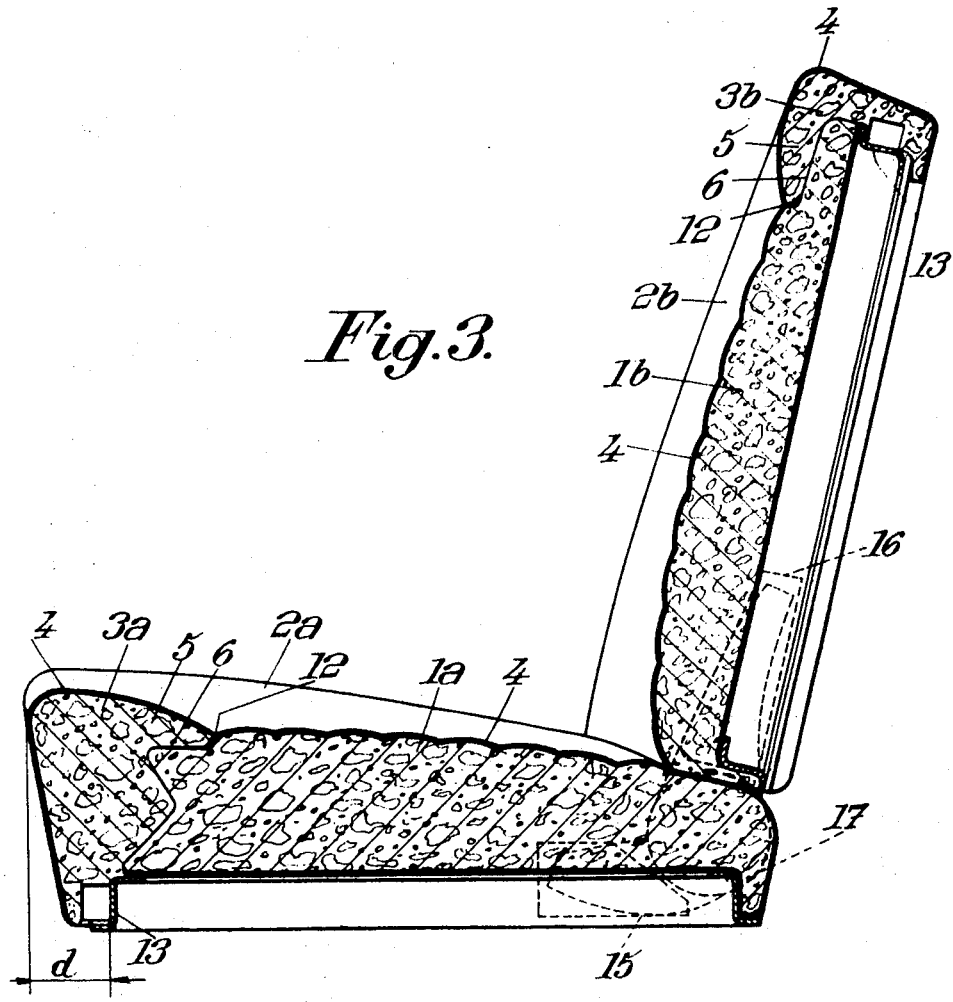
Figure 6:
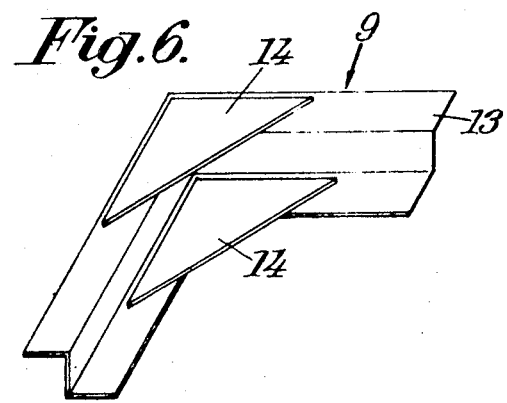
FIG. 6 shows an element of this seat in perspective view.

The frame itself is advantageously in the form of a rectangular frame made with the aid of rigid angle members 13 (FIGS. 2 to 6) the profile of which is in the shape of a Z drawn out like a step. This frame is reinforced at its four corners by brackets 14.

Further, the two frames corresponding respectively to the seat portion and the back portion of a seat carry small plates (15, 16) suitable for supporting a system for the articulation of the back portion to the seat portion, the system being adjustable, for example by rotation of an external knob 18 easily accessible by the seated person.

Each frame may further comprise suitable anchorage points for other elements, such as a rest or rails adapted for sliding in guides in the flooring of the vehicle.

Of course, the principles explained above are applicable perfectly well to bench seats for several places.

It is in this way that the rear bench seat 7 of the vehicle, shown in FIG. 7, has been made, in which seat there are foam blocks individually covered as has been explained above, viz. resilient slabs 1a, 1b, firmer sides 2a, 2b (which are here three in number, one of the three sides extending to the center of the bench seat) and front and upper pads 3a and 3b.

As is evident, and as also emerges from the foregoing, the invention is in no way limited to those applications or practical forms of its various parts that have been particularly illustrated; on the contrary, it includes all modifications, in particular those in which the cellular material is constituted by a resilient substance other than a foam (of polyurethane or other substance), for example a resilient fibrous structure whether or not impregnated with foam, and those in which the seats are intended for purposes other than for equipping a vehicle, for example for home furnishing.

I claim:

1. A seat cushion comprising a central slab of cellular material having a person-supporting external surface bonded by marginal zones, and two side members of cellular material each having a projecting edge portion with a free extremity, the projecting edge portion of each said side members covering a respective said marginal zone of said external surface of said central slab, the juxtaposed faces of said marginal zone and said edge portion having complementary zigzag profiles in a plane perpendicular to said faces and said cellular material of said central slab being of greater resiliency than said cellular material of said side members.

2. A seat cushion comprising a central slab of cellular material having a person-supporting external surface bounded by marginal zones set back therein, and two side members of cellular material each having a projecting edge portion with a free extremity, the projecting edge portion of each said side member covering a respective said marginal zone of said external surface of said central slab, the juxtaposed faces of said marginal zone and said edge portion having complementary zigzag profiles in a plane perpendicular to said faces and said cellular material of said central slab being of greater resiliency than said cellular material of said side members.

3. A seat cushion as defined in claim 2 wherein said projecting edge portion of each said side member decreases in thickness towards its free extremity.

4. A seat cushion comprising a central slab of cellular material having marginal zones, and two side members of cellular material each having a projecting edge portion with a free extremity, the projecting edge portion of each said side member covering a respective marginal zone of said central slab and said cellular material of said central slab being of greater resiliency than said cellular material of said side members and including a terminal pad of cellular material having a projecting edge portion with a free extremity, said projecting edge portion of said terminal pad covering a marginal zone of said central slab adjacent said marginal portions of said central slab covered by said projecting edge portions of said side members and said cellular material of said terminal pad being of greater resiliency than said cellular material of said central slab.

5. A seat cushion as defined in claim 4 wherein each of said projecting edge portions decreasing in thickness towards its free extremity.

6. A seat cushion comprising a central slab of cellular material having marginal zones, and two side members of cellular material each having a projecting edge portion with a free extremity, the projecting edge portion of each said side member covering a respective marginal zone of said central slab, and said cellular material of said central slab being of greater resiliency than said cellular material of said side members wherein said central slab and each said side member abut at an interface, said interface defining in section perpendicular thereto a zigzag line with rounded edges including at least one Z.

7. A seat having a seat portion and a back portion at least one of which portions comprises a frame and a seat cushion supported on said frame, said seat cushion comprising a central slab of cellular material having a person-supporting external surface bounded by marginal zones, and two side members of cellular material each having a projecting edge portion with a free extremity, the projecting edge portion of each said side member covering a respective marginal zone of said external surface of said central slab, the juxtaposed faces of said marginal zone and said edge portion having complementary zigzag profiles in a plane perpendicular to said faces and said cellular material of said central slab being of greater resiliency than said cellular material of said side members and said frame directly supporting the periphery of said central slab.